May 5, 1953  L. W. SCHMIDT ET AL  2,637,155
BEET HARVESTOR FOR WHEEL-TYPE TRACTORS
Filed Jan. 23, 1950  4 Sheets-Sheet 1
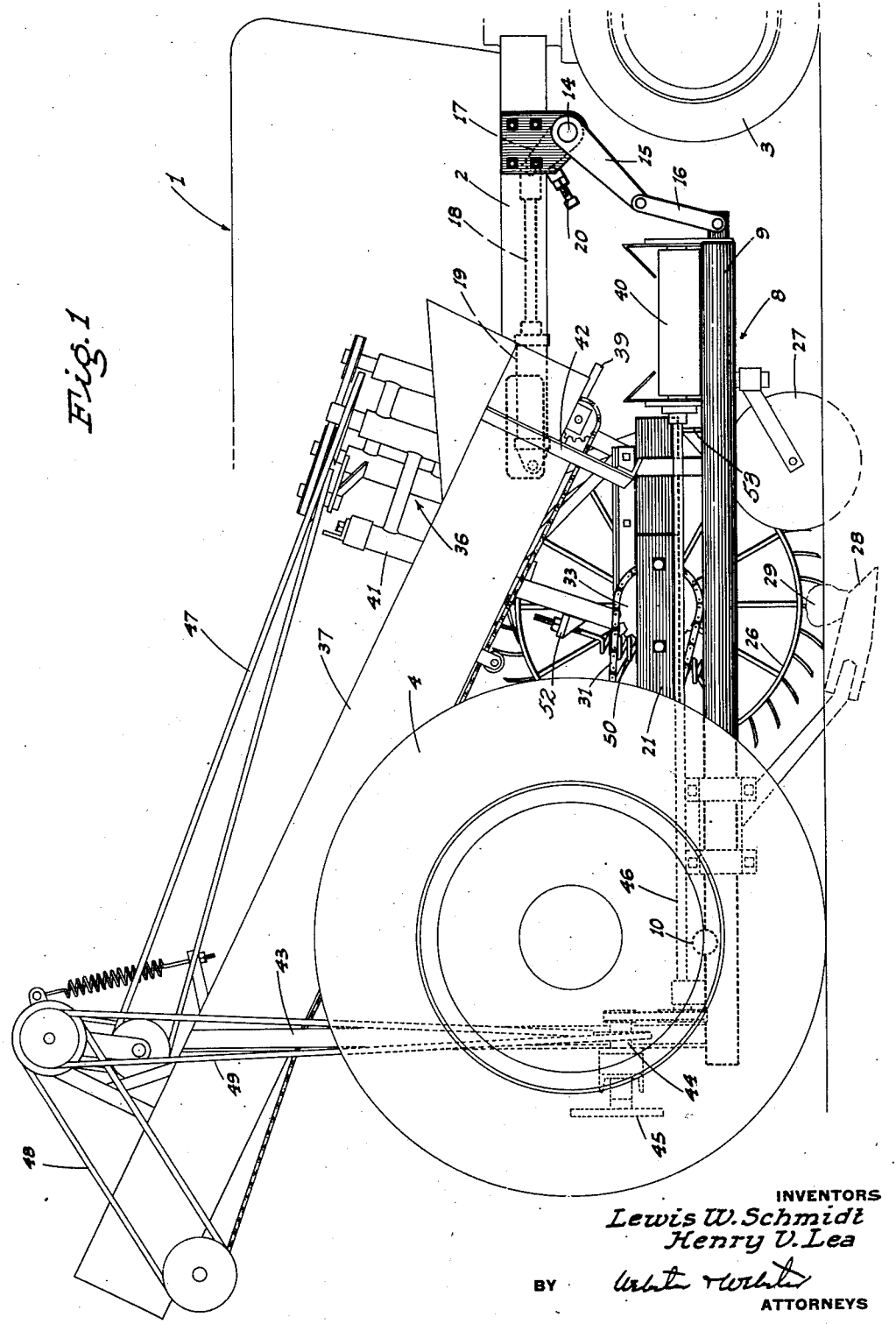
INVENTORS
Lewis W. Schmidt
Henry V. Lea
BY
ATTORNEYS

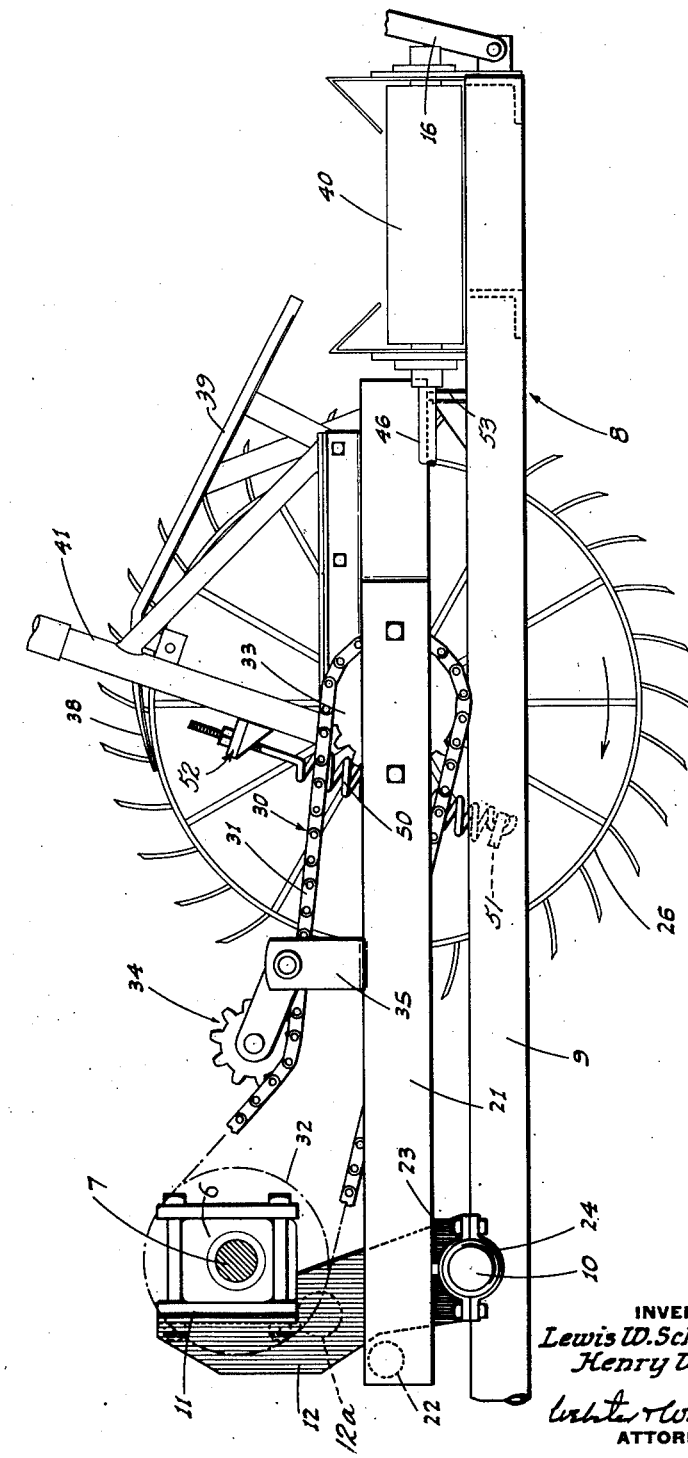

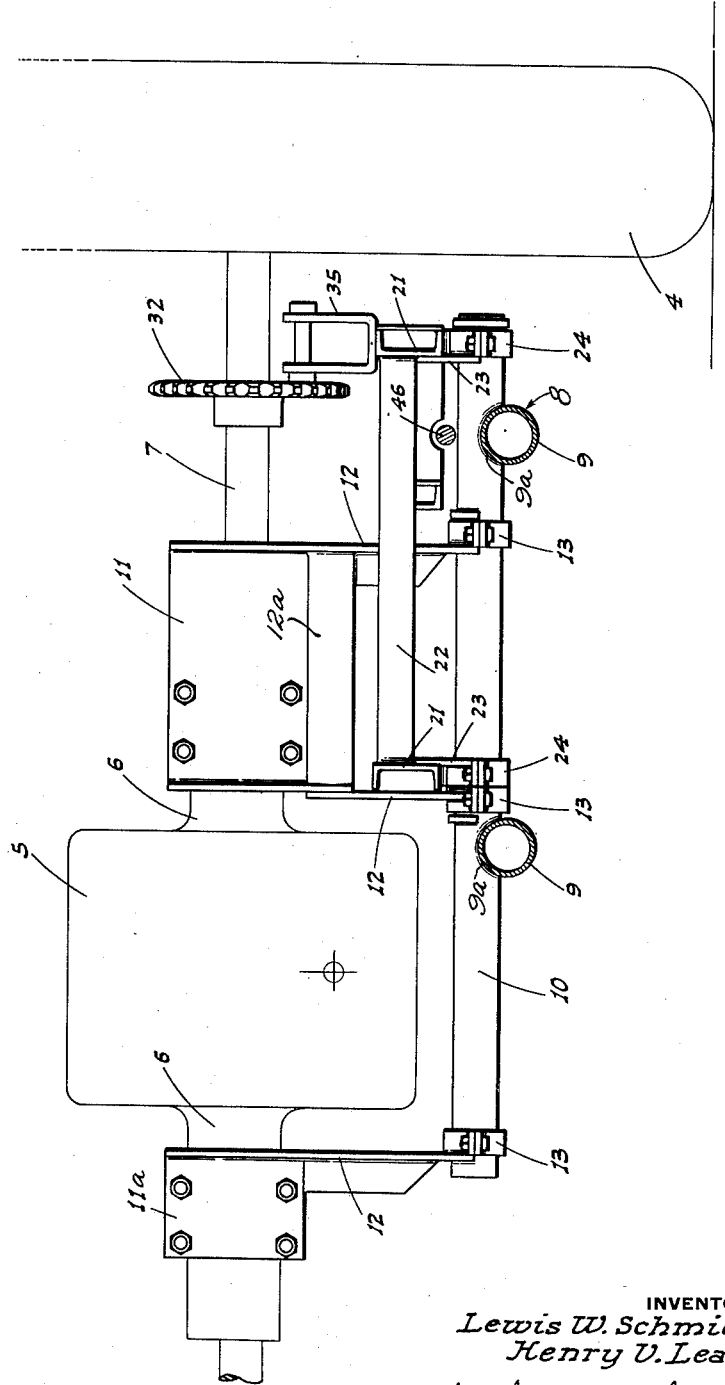

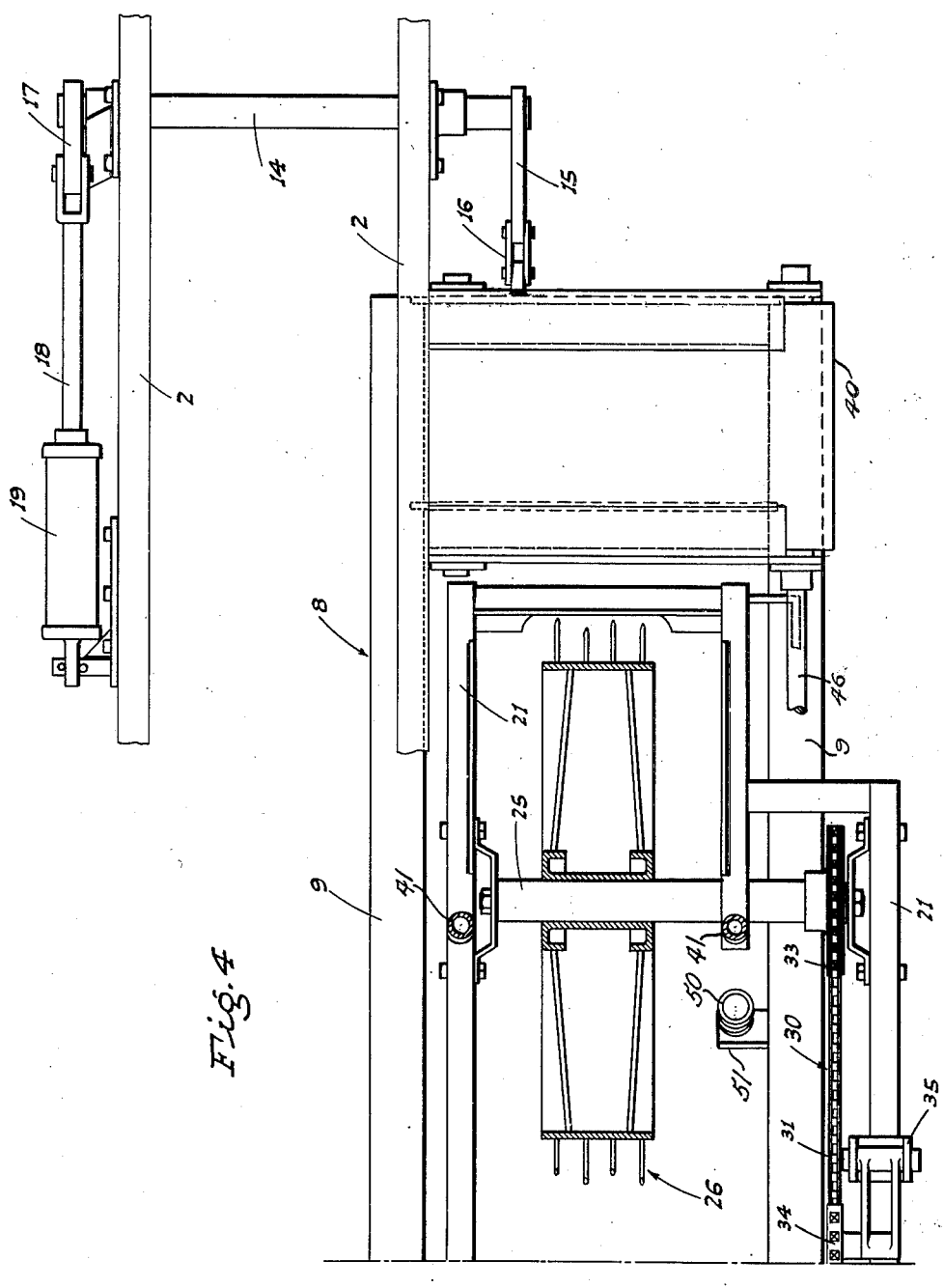

Patented May 5, 1953

2,637,155

UNITED STATES PATENT OFFICE 2,637,155

BEET HARVESTER FOR WHEEL-TYPE TRACTORS

Lewis Wallace Schmidt and Henry Vincent Lea, Rio Vista, Calif.

Application January 23, 1950, Serial No. 140,016

3 Claims. (Cl. 55—106)

The present invention is directed to an improved beet harvester adapted to be mounted on a wheel-type tractor laterally of one side thereof and between the front and rear wheels; the instant design being a modification of the tractor mounted beet harvester shown in copending application, Serial No. 772,798, filed September 8, 1947, and now Patent No. 2,535,960, dated December 26, 1950.

As in the previous embodiment the beet harvester presently incorporates a frame assembly, secured to and mainly projecting longitudinally ahead of the rear axle structure of the tractor, including a main frame and a floating secondary frame arranged therewith; said secondary frame supporting a spiked, beet pick-up wheel driven from one rear axle of said tractor.

It is a major object of the present invention to mount the floating secondary frame, and drive the spiked, beet pick-up wheel in a novel manner; such mount and drive being arranged so that upon the spiked, beet pick-up wheel encountering too great resistance to rotation, as when hard ground is traversed, the wheel is automatically lifted sufficient to relieve the hard turning of the wheel and the resultant drag on tractor motion.

Another object of the invention is to accomplish the foregoing result by pivotally mounting the floating secondary frame at its rear end below but in substantially vertical alinement with the adjacent tractor axle; the spiked, beet pick-up wheel being driven by an endless chain and sprocket unit which inclines forwardly and downwardly from said axle to the wheel mounting shaft.

A further object of the invention is to provide a novel power actuated lift mechanism for adjusting the vertical position of the main frame.

Still another object of the invention is to provide a practical and reliable frame and mount assembly for a tractor mounted beet harvester, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of the beet harvester as mounted on a wheel-type tractor.

Fig. 2 is an enlarged, fragmentary elevation of the frame assembly, and supported spiked, beet pick-up wheel, as mounted on the tractor.

Fig. 3 is an enlarged rear end view of the mount between the rear end of the frame assembly and tractor axle housing structure, with certain parts removed, and with the rear portion of the main frame beams and adjacent parts cut away.

Fig. 4 is an enlarged fragmentary plan view of the frame assembly as mounted on the tractor, the pick-up wheel being shown in section and the tractor being omitted except for its side frames.

Referring now more particularly to the characters of reference on the drawings, the beet harvester—to which this invention is directed—is adapted to be mounted on a wheel-type tractor, indicated generally at 1, which tractor includes longitudinal side frames 2 supported by front wheels 3 and rear wheels 4. Between the rear wheels 4 the tractor includes a rear end gear case 5 and laterally projecting housings 6 which surround the driven wheel axles 7 for only a portion of their length.

The beet harvester includes a longitudinally extending frame assembly, indicated generally at 8, disposed along one side of the tractor and secured to and mainly projecting ahead of the rear axle structure of the latter.

The frame assembly 8 is of elongated rectangular configuration in plan, and comprises longitudinal transversely spaced beams 9. These beams are fixed as at 9a, by welding or the like (see Fig. 3), to a cross shaft 10 which extends from adjacent the near rear wheel 4 inwardly below the gear case 5 to a termination therebeyond. The cross shaft 10 is supported, in turnable relation, from the axle housings 6 by clamp assemblies 11 and 11a secured thereto on opposite sides of the gear case 5; there being rigid brackets 12 which depend from the clamp assemblies 11 and 11a with collars 13 on the lower ends of said brackets turnably supporting said cross shaft 10. It will be noted from Fig. 3 that clamp assembly 11 is considerably wider than clamp assembly 11a. This is in order to enable the bearing collars 13 of said assembly 11 to be widely spaced between beams 9, as shown; the brackets 12 of said assembly 11 being braced by a cross member 12a. In this manner the longitudinal main frame beams 9 are effectively pivotally supported, at their rear ends, for pushing by the tractor and for vertical swinging adjustment. The longitudinal main frame beams 9 are vertically adjustably supported, at their forward ends, as follows:

Ahead of the longitudinal main frame beams 9, the tractor frame 2 is fitted with a cross shaft 14 whose ends project laterally of said frame. At the end near the front of the longitudinal main frame beams 9 the cross shaft 14 is fitted with a rearwardly extending, radial lever arm 15, and such arm is pivotally connected by a depending link 16, in supporting and lift relation to the front end of said main frame beams 9. At the opposite end of the cross shaft 14 the same is fitted with an upstanding radial lever arm 17 pivotally connected to the piston rod 18 of a longitudinal, fluid pressure actuated operator controlled power cylinder 19 affixed to the adjacent side of the tractor frame 2 rearwardly of the cross shaft 14.

Upon actuation of the power cylinder 19, with resultant rotation of the cross shaft 14, the longitudinal frame beams 9 and frame 8 as a whole may be adjusted up or down, selectively; the extent of downward motion being limited by an adjustable stop 20 which cooperates with the radial lever arm 17. Thus, when the frame beams 9 are in fully lowered working position, the stop 20 supports said frame and relieves the cylinder 19 of the load.

In addition to the longitudinal main frame beams 9, the frame assembly 8 includes a longitudinal, floating secondary frame 21 disposed above said main frame beams 9 and likewise of elongated rectangular configuration and open construction.

At its rear end the floating secondary frame 21 is pivotally connected to the cross shaft 10 in the following manner:

Slightly ahead of its rear end, which rear end is connected by a cross member 22, the floating secondary frame 21 is fitted, on opposite sides, with dependent attachment plates 23 secured to collars 24 which turn on, and are supported by, the cross shaft 10. It is to be noted that the cross shaft 10, and consequently the axis of vertical floating of the secondary frame 21, is a considerable distance below and substantially vertically alined with the corresponding axle 7 of the tractor; this being an important feature for the reason which will hereinafter appear.

Adjacent but short of its forward end the floating secondary frame 21 is fitted with a transverse, wheel-mounting shaft 25 on which a spiked, beet pick-up wheel 26 is secured; such wheel being of sufficient diameter that it extends a considerable distance below the main frame assembly 8 for ground engagement; such main frame assembly 8 carrying foliage severing coulters 27 which run ahead of the wheel on opposite sides, and a sub-soil, beet lifting plow 28 which runs beneath the beet row to loosen and lift beets 29 for impaling on said wheel.

The spiked, beet pick-up wheel 26 is driven, with the bottom portion turning rearwardly—i. e. contra to the direction of travel of the tractor—by an endless chain and sprocket unit, indicated generally at 30; such unit including an endless chain 31 which extends at a forward and downward incline from the tractor axle structure to the spiked, beet pick-up wheel 26. At its rear end the endless chain 31 is trained about a sprocket 32 on the corresponding axle 7, while at its forward end the endless chain 31 is trained about a sprocket 33 on the wheel mounting shaft 25.

A chain tightening unit 34, mounted on a bracket 35, cooperates with the upper run of the endless chain 31 to maintain the latter tight in any position of vertical floating of the secondary frame 21.

In cooperation with the above described frame assembly, its mount, and the spiked, beet pick-up wheel drive, the harvester embodies beet topping, top stripping, and beet conveying mechanism not materially dissimilar from that shown in the identified copending application.

The beets 29, after being impaled on the spiked, beet pick-up wheel 26 at the bottom thereof, travel with said wheel to the top, whence they are severed from the spike engaged crowns by a beet topping unit, indicated generally and in part at 36; the beets being diverted into, and carried rearwardly by, a longitudinal elevator conveyor 37. The beet tops or crowns are stripped from the spikes of the wheel 26 by beet top strippers 38 and deliver, by a chute 39, to a transverse, carry-off conveyor 40 at the front of the frame beams 9 ahead of the floating secondary frame 21.

The beet topping unit 36, strippers 38, and chute 39 are supported by a post assembly 41 which upstands from said secondary frame. The elevator conveyor 37 is supported from the frame beams 9 by front posts 42 and rear posts 43. The construction and operation of the topping unit, the relationship of said unit to the conveyor 37, the construction of said conveyor and of the strippers 38, and the mounting of these parts relative to each other, are the same as, and are fully shown and described in, said Patent No. 2,535,960.

The driving arrangement for the foregoing generally described mechanisms includes a countershaft unit 44 supported from the rear end of the main frame beams 9 and driven from the rear end power take-off shaft (not shown) of the tractor by an endless belt and pulley unit, shown in part at 45. The transverse conveyor 40 is driven by a longitudinal shaft 46 actuated from the countershaft unit 44.

The beet topping unit 36 and the elevator conveyor 37 are driven by endless belt and pulley units 47 and 48, which are in turn actuated by an endless belt and pulley system 49 from the countershaft unit 44. This driving arrangement also is the same as that shown in said Patent No. 2,535,960, and forms no part of this invention.

When the beet harvester is in operation, the floating secondary frame 21 is urged in a downward direction by a hold-down tension spring 50 which connects between the post assembly 41 and one of the main frame beams 9 on one side of the latter, by means of an ear 51 on said beam, and a bracket 52 projecting from the rear of the adjacent post member 41. This maintains the spiked, beet pick-up wheel 26 in firm ground engagement so as to effectively impale the beets 29, whence said beets rise to the top of the wheel and are there topped etc., as hereinbefore described.

As the spiked, beet pick-up wheel 26 is driven from one of the tractor axles 7, hard turning of said wheel occasioned—for example—by the latter encountering hard ground, is reflected as drag on forward motion of the tractor. This would tend to stall the tractor, except for the fact that under such conditions of hard turning the spiked, beet pick-up wheel 26 automatically lifts to an extent sufficient to relieve the hard turning condition and the resultant drag on the tractor. This automatic lifting occurs by reason of the fact that the floating secondary frame 21 has its axis, i. e., the cross shaft 10, a considerable distance directly below the related axle 7, with the endless chain 31 extending at a forward and downward incline from the sprocket 32 to the sprocket 33. The result is that when hard turning conditions occur on the spiked, beet pick-up wheel 26, such resistance to turning as imposed on the endless chain 31 causes it to tend to lift the floating secondary frame 21; i. e. to swing it upwardly about cross shaft 10 as an axis. This action is wholly automatic and occurs without attention on the part of the tractor operator, thus being extremely valuable to assure of the smooth forward advance of the tractor with the implement, and without stalling when hard ground or other conditions are encountered which cause hard turning of the spiked, beet pick-up wheel.

When it is desired to vertically adjust the main frame assembly 8, or to lift said assembly with the secondary frame 21 to a high position for vertical transport with the wheel 26 out of ground contact, the power cylinder 19 is brought into play, rotating the cross shaft 14 in the appropriate direction to cause the radial lever arm 15 to swing upwardly, lifting the links 16 together with the forward end of the main assembly 8. The secondary frame 21 lifts with the main assembly 8 by reason of the fact that a stop 53 on the main assembly engages and lifts the secondary frame.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a beet harvester adapted to be mounted on a tractor having a rear axle housing, a longitudinal frame assembly adapted to extend along one side of the tractor mainly ahead of the axle housing, said assembly including a main frame and a secondary frame separate therefrom, the secondary frame having a driven beet pick-up wheel thereon, a mount supporting the frames at their rear end from the axle housing and including a cross shaft below the housing, on which the frames are separately turnable, means supporting the secondary frame from the main frame for upward floating movement from a predetermined low position on the main frame, and means to suspend the main frame adjacent its forward end from the tractor.

2. A structure as in claim 1, in which said last named means comprises a cross shaft turnably mounted on the tractor at the sides thereof and ahead of the main frame, a link upstanding from the forward end of the main frame, a radial arm on the cross shaft to which the upper end of the link is connected, and operator-controlled means to rotate said shaft.

3. A beet harvester attachment for a tractor having ground engaging driving wheels and an axle on which the wheels are fixed; said attachment including a longitudinal frame, means pivotally supporting the frame adjacent one end for vertical swinging motion about an axis spaced below the axle, the frame extending forwardly from said pivotal axis, a shaft journaled in the frame a substantial distance ahead of the axle and parallel thereto, a beet pick-up wheel fixed on the shaft adapted to run on the ground, a sprocket on the axle, another sprocket on the shaft, and a single endless chain extending about and between said sprockets; the low point of the sprocket on the axle being in a horizontal plane a distance above the horizontal planes occupied by said pivotal axis and the shaft so that the lower and rearwardly traveling run of the endless chain has an upwardly and rearwardly inclined direct-pull line between said sprockets whereby, upon ground resistance to turning of the beet pick-up wheel, said lower run imposes a lifting force on the frame in a direction tending to swing said frame upwardly about said pivotal axis.

LEWIS WALLACE SCHMIDT.
HENRY VINCENT LEA.

References Cited in the file of this patent

UNITED STATES PATENTS

| Number | Name | Date |
|---|---|---|
| 2,350,173 | Loucks et al. | May 30, 1944 |
| 2,515,660 | Nichols | July 18, 1950 |